United States Patent [19]

Fiala

[11] 4,142,741
[45] Mar. 6, 1979

[54] PIVOTAL SCREWED FITTING

[75] Inventor: Othmar Fiala, Bielefeld, Fed. Rep. of Germany

[73] Assignee: Ermeto-Armaturen GmbH, Bielefeld, Fed. Rep. of Germany

[21] Appl. No.: 777,699

[22] Filed: Mar. 15, 1977

[30] Foreign Application Priority Data

Mar. 15, 1976 [DE] Fed. Rep. of Germany ....... 2610775

[51] Int. Cl.$^2$ ............................................ F16L 27/00
[52] U.S. Cl. ..................................... 285/39; 285/158; 285/190
[58] Field of Search ................... 285/190, 184, 39, 158

[56] References Cited

U.S. PATENT DOCUMENTS

| 899,582 | 9/1908 | Weston | 285/190 X |
|---|---|---|---|
| 1,057,289 | 3/1913 | Sieber | 285/190 X |
| 1,095,757 | 5/1914 | Wentz | 285/190 X |
| 1,532,774 | 4/1925 | Page | 285/190 |
| 1,838,740 | 12/1931 | Burnham | 285/190 X |
| 2,307,328 | 1/1943 | Martin | 285/349 X |
| 2,492,494 | 12/1949 | Mueller | 285/190 X |
| 2,872,217 | 2/1959 | May | 285/190 X |
| 2,943,868 | 7/1960 | Hanback | 285/190 X |

FOREIGN PATENT DOCUMENTS

| 1041914 | 6/1953 | France | 285/190 |
|---|---|---|---|
| 1102595 | 2/1968 | Switzerland | 285/190 |
| 814778 | 6/1959 | United Kingdom | 285/190 |
| 843338 | 8/1960 | United Kingdom | 285/190 |

*Primary Examiner*—Thomas F. Callaghan
*Attorney, Agent, or Firm*—Spencer & Kaye

[57] ABSTRACT

A pivotal screwed fitting for joining pipes has a hollow body including a coupling nipple for attachment to the end of one of the pipes. The hollow body is adjustable about the axis of the coupling nipple. The fitting further has a hollow screw arranged in the hollow body. The hollow screw has a threaded end portion to be screwed into another one of the pipes for tightening the hollow body to the last-named pipe. The hollow screw has a plurality of ports which maintain communication between an axial blind bore of the hollow screw and an annular channel defined together by the hollow body and the hollow screw. A connecting passage defined by a wall of the hollow body maintains communication between the coupling nipple and the annular channel. The passage widens from the coupling nipple in the direction of the annular channel; the wall defining the connecting passage has an at least approximately rotationally symmetrical configuration with respect to the axis of the coupling nipple of the hollow body.

12 Claims, 2 Drawing Figures

PIVOTAL SCREWED FITTING

BACKGROUND OF THE INVENTION

This invention relates to a pivotal screwed fitting for joining pipes, including a hollow body whose orientation can be adjusted and which has one or more coupling nipples. The pivotal screwed fitting further has a hollow screw which is accommodated in the hollow body and which serves to tighten the hollow body to a pipe terminal. The wall of the hollow screw is provided with ports which maintain communication, in accordance with the flow path, between the inner space of the hollow screw and an annular channel defined together by the hollow body and the hollow screw.

It is often required to join a pipe to a connection (coupling bore) whose axis extends transversely to the pipe. For this purpose it has been long known to use threaded elbow or Tee fittings screwed into the coupling bore. Such a screwed fitting is disclosed, for example, in German Pat. No. 919,622. The fitting described in this patent comprises a hollow body whose orientation may be adjusted and which has one or more coupling nipples.

In screwed fittings having an orientable body, the problem of maintaining fluid turbulence and throttle effects at the smallest possible value (or avoiding these altogether) has to be resolved. For solving this problem, the above-cited German patent teaches the provision of an inner collar on the hollow body (which carries one of more pipe coupling nipples) at its floor opening oriented towards the coupling bore of an apparatus wall. A hollow screw received in the hollow body has an externally threaded portion (which projects outwardly from a floor opening provided in the hollow body) and an outer collar. The latter firmly engages the inner collar when the hollow screw is screwed into the threaded coupling bore of the apparatus wall. In this manner a firm and fluid-tight connection is obtained between the hollow body and the hollow screw. The end face of the hollow body disposed opposite the floor opening in the hollow body is closed off in a fluid-tight manner by a screw plug. Although in this manner it is possible to provide identical cross sections for the pipe and the hollow screw so as to reduce unfavorable throttling effects, to achieve this result an additional component is necessary, namely the screw plug which, on the one hand, adds to the manufacturing expenses of the fitting and, on the other hand, makes assembly more complex.

German Pat. No. 1,074,338 discloses another pivotal screwed fitting for joining pipes which is formed merely of a hollow body and a hollow screw disposed in the hollow body for tightening the latter against the coupling bore of an apparatus. The wall of the hollow screw is provided with throughgoing ports. In order to reduce fluid turbulence and throttle effect, the hollow screw, which at the outside up to the screw threads has a cylindrical configuration, is provided at the inside of the srew head, in the bore base, either with a planar terminal wall or a drop-shaped, pointed central elevation. In case of a planar terminal wall of the bore base, however, a fluid turbulence cannot be avoided, since the transmitted fluid medium impinges on the planar closure and thus has to be deflected thereby. Although fluid turbulence can be reduced if the earlier-noted drop-shaped pointed elevation is used, the manufacture of such a bore floor is expensive; it needs special machining tools that have to be used in the course of separate, special manufacturing steps.

SUMMARY OF THE INVENTION

It is an object of the invention to provide an improved pivotal screwed fitting of the above-outlined type from which the earlier discussed known disadvantages are eliminated and which is formed merely of a direction-adjustable hollow body having one or more pipe coupling nipples and a hollow screw which is disposed within the hollow body and which is so structured that fluid turbulence and flow throttling are largely eliminated, yet the manufacturing and assembling costs are relatively small compared to known pivotal screwed fittings.

This object and others to become apparent as the specification progresses, are accomplished by the invention, according to which, briefly stated, the pivotal screwed fitting for joining pipes has a hollow body including a coupling nipple for attachment to the end of one of the pipes. The hollow body is adjustable about the axis of the coupling nipple. The fitting further has a hollow screw arranged in the hollow body. The hollow screw has a threaded end portion to be screwed into another one of the pipes for tightening the hollow body to the last-named pipe. The hollow screw has a plurality of ports which maintain communication between an axial blind bore of the hollow screw and an annular channel defined together by the hollow body and the hollow screw. A connecting passage defined by a wall of the hollow body maintains communication between the coupling nipple and the annular channel. The passage widens from the coupling nipple in the direction of the annular channel; the wall defining the connecting passage has an at least approximately rotationally symmetrical configuration with respect to the axis of the coupling nipple of the hollow body.

According to a preferred embodiment, the hollow screw has at least four transverse ports. In accordance with a further feature of the invention, the axes of the ports provided in the hollow screw constitute generatrices of an imaginary oblique circular cone.

In accordance with another feature of the invention, the axes of the ports provided in the hollow screw constitute generatrices of an imaginary circular cone and intersect the central axis of the hollow screw at least approximately in a single point.

In order to simplify assembly the hollow screw is provided with an integral extension which has an inner and an outer hexagonal configuration. Advantageously, the hollow body has, at its end oriented towards the threaded end portion of the hollow screw, a chamfered portion serving as a support for an O-ring seal. The hollow body is, at that side which is oriented towards the coupling bore into which the hollow screw is screwed, provided with an annular groove for accommodating an outer O-ring seal so that the hollow body can, in any position, be sealingly tightened by turning the hollow screw. The annular groove is so designed that the O-ring remains out of contact with the hollow screw or its thread. In this manner the O-ring is protected from being damaged. The O-rings are made preferably of elastomers, that is, of materials having a rubber-like elasticity.

DESCRIPTION OF THE PREFERRED EMBODIMENT

Figure 1:
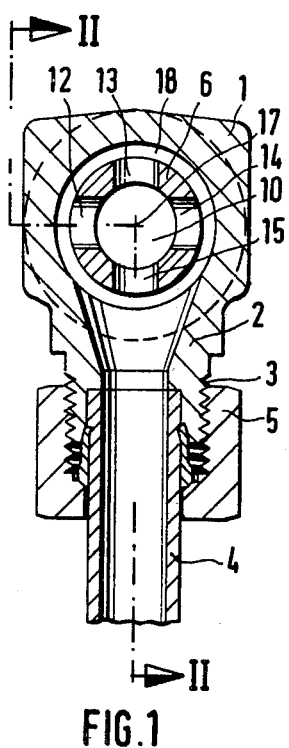
FIG. 1 is a sectional view of a preferred embodiment taken along line I—I of FIG. 2.
Figure 2:
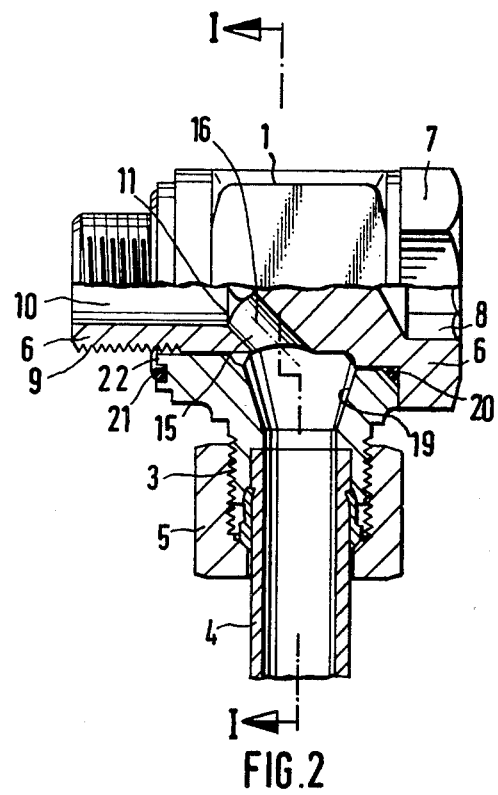
FIG. 2 is a partially sectional view taken along line II—II of FIG. 1.

Turning now to the Figures, the pivotal screwed fitting shown therein has a hollow body 1 provided with a pipe coupling nipple 2 which is provided with an external thread 3 for securing the hollow body 1 to a pipe 4 by means of an internally threaded sleeve nut 5. Prior to tightening the sleeve nut 5, the hollow body 1 may be pivoted about the axis of the nipple 2 to adjust the hollow body 1 into the desired angular orientation. The hollow body 1 accommodates and positions a hollow screw 6 which, at one end, has an integral extension provided with an external hexagonal peripheral face 7 and an internal hexagonal peripheral face 8. At its other end the hollow screw 6 is provided with an external thread 9 which can be screwed, for example, into a coupling bore of a housing (not shown). The hollow screw 6 is of cylindrical configuration and has an axial blind bore 10 which extends from the end of the externally threaded part approximately half way through the total length of the hollow screw 6. From the floor 11 of the bore 10 there extend four obliquely oriented ports 12, 13, 14 and 15 which terminate with respective openings on a cylindrical outer face of the hollow screw 6. The central axes 16 of these ports form generatrices of an imaginary conical surface and intersect at least approximately in a single point 17 on the central axis of the hollow screw 6. The conical surface may be that of an oblique circular cone.

An enlarged inner face of the hollow body 1 and the cylindrical outer face of the hollow screw 6 together define an annular channel 18. In the transitional zone from the coupling nipple 2 to the annular channel 18 there is provided an at least approximately rotationally symmetrical connecting passage 19 which widens in the direction of the axis of the hollow body 1, that is, in the direction of the annular channel 18. As it may be observed in the Figures, in any angular setting of the hollow body 1 about the axis of the hollow screw 6, one or more of the ports 12–15 will have an orientation that generally follows the direction of flare of the passage 19. The wall of the hollow body which defines the passage 19 may have, for example, a cup-shaped or a cone-shaped configuration and, as particularly well seen in FIG. 1, it merges substantially tangentially with that inner wall of the hollow body which bounds the annular channel 18.

The hollow body 1 has at its end which is oriented towards the integral extension of the hollow screw 6 a chamfered portion 20 which serves as a support face for an O-ring seal positioned between the face 20 and a radial shoulder of the hollow screw 6. The hollow body 1 further has at its side adjacent the threaded portion of the hollow screw 6, an annular groove 21 which serves for accommodating a further O-ring seal. The annular groove 21 surrounds a web portion 22 which protects the O-ring seal from being damaged by the hollow screw or its thread during assembly (tightening). The O-ring seals are made conventionally of an elastomer and have preferably identical dimensions.

The Figures show a sole angular screwed fitting, that is, a hollow body 1 with a sole coupling nipple 2. It is to be understood, however, that the invention may encompass a T-shaped pivotal screwed fitting as well, wherein then, in each transitional zone from the respective pipe coupling nipple to the annular channel, a separate passage 19 is provided which has an at least approximately rotationally symmetrical configuration and which widens towards the annular channel 18.

Although in the illustrated embodiment the number of the ports provided in the wall of the hollow screw 6 is four, it is to be understood that a greater or lesser number of ports may be provided. The central axes of the ports 12, 13, 14 and 15 which form generatrices of a conical surface, form an angle of approximately 45° with the central axis of the hollow body 1. It is to be understood that this angle may be different; thus, the ports may have a greater or lesser inclination with respect to the axis of the hollow body 1.

It will be understood that the above description of the present invention is susceptible to various modifications, changes and adaptations, and the same are intended to be comprehended within the meaning and range of equivalents of the appended claims.

What is claimd is:

1. In a pivotal screwed fitting for joining pipes having a hollow body including nipple for attachment to the end of one of the pipes; the hollow body being adjustable about the axis of the coupling nipple; a hollow screw arranged in the hollow body and having a threaded portion to be screwed into another one of the pipes for tightening the hollow body to the last-named pipe; an annular channel defined together by a cylindrical outer face of the hollow screw and an enlarged inner face of the hollow body; an axial blind bore provided in the hollow screw; a plurality of ports provided in the hollow screw for maintaining communication between the blind bore and the annular channel and terminating with respective openings on the cylindrical outer face of the hollow screw; and a connecting passage defined by wall means of the hollow body for maintaining communication between the coupling nipple and the annular channel; the improvement wherein said passage widens from said coupling nipple in the direction of said annular channel; and said wall means defining said connecting passage having an at least approximately rotationally symmetrical configuration with respect to the axis of said coupling nipple of said hollow body, further wherein the axes of said ports are oriented at an oblique inclination to the axis of the hollow screw and intersect the axis of the hollow screw substantially in a single point and further wherein said axes of said ports constitute generatrices of an imaginary circular cone, whereby a low-resistance, turbulence-free passage of the liquid through the pivotal screwed fitting is provided.

2. A pivotal screwed fitting as defined in claim 1, wherein said wall means has a cup-shaped configuration.

3. A pivotal screwed fitting as defined in claim 1, wherein said wall means has a conical configuration.

4. A pivotal screwed fitting as defined in claim 1, wherein said imaginary circular cone is oblique.

5. A pivotal screwed fitting as defined in claim 1, wherein said hollow screw includes an extension remote from said threaded end portion, said extension having hexagonal inner and outer peripheral faces.

6. A pivotal screwed fitting as defined in claim 1, wherein said hollow body has, at a side remote from said threaded end portion of said hollow screw, a chamfered face constituting a support; and an O-ring disposed between said chamfered face and a radial shoulder of said hollow screw.

7. A pivotal screwed fitting as defined in claim 1, wherein said hollow body has, at a side adjacent said threaded end portion of said hollow screw, an annular groove surrounding said hollow screw and an O-ring accommodated in said annular groove.

8. A pivotal screwed fitting as defined in claim 7, wherein said O-ring is made of an elastomer.

9. A pivotal screwed fitting as defined in claim 7, wherein said hollow body further comprises an annular web portion surrounded by said groove, said web portion protecting said O-ring from being damaged by said hollow screw.

10. A pivotal screwed fitting as defined in claim 7, wherein said hollow body has, at a side remote from said threaded end portion of said hollow screw, a chamfered face constituting a support; and an additional O-ring disposed between said chamfered face and a radial shoulder of said hollow screw; said O-rings having identical dimensions.

11. A pivotal screwed fitting as defined in claim 1, wherein the widening of said passage towards said annular channel is gradual.

12. A pivotal screwed fitting as defined in claim 1, wherein said wall means defining said connecting passage are first wall means and wherein said annular channel is bounded by second wall means of said hollow body and further wherein said first wall means merge substantially tangentially in said second wall means.

* * * * *